United States Patent [19]

Oshima et al.

[11] Patent Number: 4,540,744
[45] Date of Patent: Sep. 10, 1985

[54] BUTADIENE-BASE POLYMER AND A PROCESS FOR PRODUCING THE SAME

[75] Inventors: Noboru Oshima, Suzuka; Isamu Shimizu, Kameyama; Yoshito Yoshimura, Yokkaichi, all of Japan

[73] Assignees: Bridgestone Tire Company Limited; Japan Synthetic Rubber Co., Ltd., both of Tokyo, Japan

[21] Appl. No.: 701,438

[22] Filed: Feb. 12, 1985

Related U.S. Application Data

[63] Continuation of Ser. No. 545,288, Oct. 25, 1983, abandoned.

[30] Foreign Application Priority Data

Oct. 27, 1982 [JP] Japan ................................. 57-187477

[51] Int. Cl.$^3$ ................................................. C08F 8/42
[52] U.S. Cl. .................................. 525/332.9; 525/314; 525/901; 526/340.4
[58] Field of Search ..................... 526/340.4; 525/314, 525/332.9, 333.3, 901

[56] References Cited

U.S. PATENT DOCUMENTS 3,985,830 10/1976 Fetters ................................. 525/314
4,104,326 8/1978 Fodor ................................... 525/901
4,386,125 5/1983 Shiraki ................................. 525/314
4,396,743 8/1983 Fujimaki ............................. 525/314

Primary Examiner—Paul R. Michl
Attorney, Agent, or Firm—Sughrue, Mion, Zinn, Macpeak and Seas

[57] ABSTRACT

A butadiene-base polymer containing a branched polymer through tin-carbon bond and a process for producing the same are disclosed. The butadiene-base polymer is produced by polymerizing 1,3-butadiene alone or 1,3-butadiene and aromatic vinyl compound in a hydrocarbon solvent in the presence of a Lewis base using an organolithium compound as an initiator and then coupling with a tin halide, and satisfies the following requirements:

(1) a content of a bound aromatic vinyl compound in the butadiene-base polymer is 0–40% by weight;
(2) a ratio of vinyl bond-containing butadiene unit in the toal butadiene unit of the butadiene-base polymer is 30–90%;
(3) a ratio of the branched polymer in the butadiene-base polymer is at least 30% by weight; and
(4) a ratio of a component having a molecular weight of less than 100,000 as polystyrene in the molecular weight distribution as measured by a gel permeation chromatography is 10–20% by weight.

17 Claims, No Drawings

BUTADIENE-BASE POLYMER AND A PROCESS FOR PRODUCING THE SAME

This is a continuation of application Ser. No. 545,288 filed 10/25/83, now abandoned.

BACKGROUND OF THE INVENTION

(1) Field of the Invention

This invention relates to butadiene-base polymers having an improved processability and a process for producing the same.

(2) Description of the Prior Art

From demands for running safety and low fuel consumption in the automobiles, there have been proposed butadiene-base polymers having a high content of vinyl bond in butadiene portion and containing a branched polymer as a rubber materials for use in tire tread having improved breaking strength, wet-skid resistance, hysteresis properties and the like as disclosed, for instance, in Japanese Patent laid open No. 57-55,912 and No. 57-87,407.

However, when these butadiene-base polymers are used alone, they have problems in processability because the mill processability during the extrusion of the kneaded mass with carbon black is poor and also the glossiness and smoothness of the extrudate are poor. Thus, the butadiene-base polymer of this type should be used as a blend with other rubber.

SUMMARY OF THE INVENTION

Now, the inventors have aimed at and made various studies with respect to the molecular weight distribution of the butadiene-base polymer and found out that butadiene-base polymers containing a branched polymer through tin-carbon bond and having a specified image range of a particular low molecular weight polymer in the molecular weight distribution as measured by a gel permeation chromatography (GPC) can improve the mill processability, glossiness and smoothness without deteriorating the hysteresis loss, fracture properties and the like and as a result, the invention has been accomplished.

According to the invention, there are provided a butadiene-base polymer containing a branched polymer through tin-carbon bond at a branching point and a process for producing the same. This butadiene-base polymer is produced by polymerizing 1,3-butadiene alone or 1,3-butadiene and an aromatic vinyl compound in a hydrocarbon solvent in the presence of a Lewis base using an organolithium compound as an initiator and then coupling with a tin halide, and satisfies the following requirements:

(1) a content of a bound aromatic vinyl compound in the butadiene-base polymer is 0–40% by weight;
(2) a ratio of vinyl bond-containing butadiene unit in the total butadiene unit of the butadiene-base polymer is 30–90%;
(3) a ratio of the branched polymer in the butadiene-base polymer is at least 30% by weight; and
(4) a ratio of a component having a molecular weight of less than 100,000 as polystyrene in the molecular weight distribution as measured by a gel permeation chromatography is 10–20% by weight.

DETAILED DESCRIPTION OF THE INVENTION

In the butadiene-base polymer according to the invention, as the aromatic vinyl compound to be used in an amount of 0–40% by weight, mention may be made of styrene, p-methylstyrene, vinyltoluene, p-ethylstyrene, vinylnahthalene and the like, and among them, styrene is preferable. The content of the bound aromatic vinyl compound in the butadiene-base polymer is not more than 40% by weight, preferably 10–30% by weight in view of the balance between the fracture properties and hysteresis loss. When the content of the bound aromatic vinyl compound exceeds 40% by weight, the hysteresis loss and fracture properties are unfavorably deteriorated. The bound aromatic vinyl compound in the butadiene-base polymer is preferable to contain not more than 10% of block polyvinyl aromatic compound at random state as measured according to the oxidation decomposition method described by I. M. Kolthoff et al in J. Polymer Sci., Vol. 1, p. 429, 1964. The bound aromatic vinyl compound may be uniformly or ununiformly distributed along the molecular chain of the butadiene-base polymer.

The ratio of vinyl bond-containing butadiene units in the total butadiene unit of the butadiene-base polymer according to the invention is 30–90%, preferably 35–75%. If the ratio of vinyl bond-containing butadiene unit is less than 30%, the wet-skid resistance degrades, while if it exceeds 90%, the breaking strength lowers.

The ratio of the branched polymer in the butadiene-base polymer according to the invention is at least 30% by weight, preferably not less than 40% by weight. The ratio of the branched polymer is determined from a ratio of peak area on high molecular weight side to the total area in the bimodal molecular weight distribution of the gel permeation chromatography (GPC). If the ratio of the branched polymer in the butadiene-base polymer is less than 30% by weight, the hysteresis loss and the breaking strength deteriorate unfavorably.

In this case, it is important that the bond at the branching point for the branched polymer is tin-carbon bond. If the bond at the branching point is silicon-carbon bond, carbon-carbon bond or the like, no satisfactory effect for improving the hysteresis loss can be obtained. As the tin-carbon bond at the branching point for the branched polymer according to the invention, tin-butadienyl bond is most preferable.

The Mooney viscosity ($ML_{1+4}100°$ C.) of the butadiene-base polymer according to the invention is preferably within a range of 30–100. If the Mooney viscosity is less than 30, the hysteresis loss degrades, while if it exceeds 100, the processability lowers unfavorably.

The molecular weight distribution in the butadiene-base polymer according to the invention as measured by the gel permeation chromatography (GPC) is a bimodal type which consists of a peak on the high molecular weight side (the peak of the branched polymer) and a peak on the low molecular weight side (the peak of the non-branched polymer). A feature of the butadiene-base polymer according to the invention is that the ratio of component having a molecular weight of less than 100,000 as polystyrene, which is existent in the peak on low molecular weight side, is within a range of 10–20% by weight. If the ratio of component having the molecular weight of less than 100,000 as polystyrene exceeds 20% by weight, the hysteresis loss degrades, while if it is less than 10% by weight, the processability becomes poor.

The butadiene-base polymer according to the invention having the above properties may be produced by the following process.

Namely, when polymerizing 1,3-butadiene alone or 1,3-butadiene and an aromatic vinyl compound in a hydrocarbon solvent in the presence of a Lewis base using an organolithium compound as an initiator, a hydrocarbon solvent containing an active hydrogen-containing compound selected from the group consisting of water, alcohols and phenols in an amount of 0.01–0.20 mol per one atomic equivalent of lithium atom in the organolithium initiator is continuously or intermittently added at such a stage that the conversion rate of monomer reaches 10–90%, and after the polymerization is completed, the resulting butadiene-base polymer with lithium atom at terminal is coupled with a tin halide.

In this case, the hydrocarbon solvent containing the active hydrogen-containing compound to be continuously or intermittently added is used in an amount of 100–500 parts by weight based on 100 parts by weight of total monomer, and may be added as an admixture with the monomer.

As the hydrocarbon solvent, mention may be made of pentane, hexane, heptane, cyclohexane, methylcylcopentane, benzene, toluene, xylene and the like, which is employed alone or in combination in an amount of 0.5–20 parts by weight per one part by weight of the monomer.

As the Lewis base, mention may be made of ethers and tertiary amines, a typical example of which includes diethyl ether, dibutyl ether, tetrahydrofuran, 2-methoxy tetrahydrofuran, 2-methoxymethyl tetrahydrofuran, ethylene glycol dimethyl ether, ethylene glycol diethyl ether, ethylene glycol dibutyl ether, triethylamine, pyridine, N,N,N',N'-tetramethylethylenediamine, N,N,N',N'-tetraethylethylenediamine, N-methylmorpholine, triethylenediamine and the like.

The organolithium compound includes ethyllithium, propyllithium, butyllithium, pentyllithium, 1,4-dilithiobutane, 1,5-dilithiopentane and the like. The amount of the organolithium compound used is within a range of 0.2–20 mmol per 100 g of the monomer. Moreover, the amount of the Lewis base such as tertiary amine and ether used is within a range of 0.05–1,000 mol per one mol of the organolithium compound.

The polymerization may be carried out in a batch system or a continuous system using, for example, a tubular reactor. The polymerization temperature is within a range of −20° to 150° C. Moreover, the ratio of vinyl bond-containing butadiene unit in the total butadiene unit may be adjusted to the range of 30–90% by properly selecting the kind and amount of the Lewis base and the polymerization temperature.

The active hydrogen-containing compound to be added at the stage of the conversion rate of 10–90% specifically includes water; alcohols such as methanol, ethanol, propanol, butanol, 2-ethylhexanol, decanol and the like; and phenols such as phenol, cresol, nonyl phenol, xylenol, 2,6-di-tert-butyl-p-cresol, 2(3)-butyl-4-hydroxyanisole and the like. Among them, water is preferable.

After the completion of the polymerization, the coupling of the resulting straight chain butadiene-base polymer is carried out by using a tin halide as a coupling agent. As the tin halide, use may be made of tin methyl trichloride, tin tetrachloride, tin butyl trichloride, tin octyl trichloride, tin methyl tribromide, tin octyl tribromide, tin tetrabromide, tin tetraiodide, tin cyclohexyl trichloride, tin phenyl trichloride, 1,2-bis(trichlorostannyl)ethane, 1,2-bis(methyldichlorostannyl)ethane, 1,4-bis(trichlorostannyl)butane, 1,4-bis(methyldichlorostannyl)butane and the like. The coupling reaction with the tin halide is usually carried out at a temperature of 0°~150° C. for a time of 1 minute~20 hours. The amount of the tin halide used is within a range of 0.1~3.0 equivalent, preferably 0.2~1.5 equivalent of halogen atom per one atomic equivalent of lithium atom in the organolithium compound.

In case of the production of the butadiene-base polymer having tin-butadienyl bond at the branching point as a preferred embodiment according to the invention, it is desirable to add 1,3-butadiene in an amount of 0.5–100 mol, preferably 1–50 mol per one atomic equivalent of lithium atom in the organolithium compound immediately before the addition of the tin halide.

The butadiene-base polymer according to the invention may be also prepared by the following method.

When 1,3-butadiene alone or 1,3-butadiene and an aromatic vinyl compound are polymerized in a hydrocarbon solvent in the presence of a Lewis base using an organolithium compound as an initiator, a compound selected from the group consisting of α-acetylenes such as acetylene, propyne, 1-butyne, isopropenyl acetylene and vinylacetylene; allenes such as allene, methylallene and ethylallene; active hydrogen-containing compounds such as cyclopentadiene, indene, 9-phenylfluorene, 1,4-dihydrobenzene and dihydronaphthalene; and halogen compounds such as benzyl chloride, allyl chloride, crotyl chloride and t-butyl chloride is added continuously or intermittently in an amount of 0.1–2.0 mol per one atomic equivalent of lithium atom in the organolithium initiator at such a stage that the conversion rate reaches 10–90%, and after the polymerization is completed, the butadiene-base polymer with the remaining active lithium atom at terminal is coupled with a tin halide. In this case, the active hydrogen-containing compound or the halogen compound may be continuously or intermittently added by diluting with an appropriate solvent or with the monomer which is added also continuously or intermittently.

The butadiene-base polymer according to the invention may be used alone or in a blend with at least one rubber selected from natural rubber and synthetic rubbers such as high-cis-1,4 polyisoprene, emulsion-polymerized styrene-butadiene copolymer, solution-polymerized styrene-butadiene copolymer, high-cis-1,4 polybutadiene, low-cis-1,4 polybutadiene and the like, which is compounded with conventionally known compounding agents such as filler, process oil, vulcanizing agent, vulcanization accelerator and the like, and then vulcanized for applying to tires such as tire tread, tire sidewall, tire belt portion, tire bead portion and the like as well as vibration insulating rubbers, fenders, belts, hoses, window frames and other industrial products. Further, the polymer according to the invention may be employed as a base rubber for impact resistant resins obtained by polymerization with styrene, or styrene and acrylonitrile.

The following examples are given in illustration of the invention and are not intended as limitations thereof.

In the following examples, the measurement of each property was evaluated as follows.

The content of bound styrene was determined by an infrared method using an absorption assigned to phenyl group of 699 cm$^{-1}$ measured from the calibration curve.

The microstructure of butadiene unit in the polymer was determined by an infrared method (Morero's method).

The rebound resilience was measured at 50° C. by means of a Dunlop tripsometer as an index for hysteresis loss of a tire tread. The larger the index value, the better the property.

The tensile properties were measured according to the method of JIS K 6301.

The wet-skid resistance was measured on a wet surface of an indoor asphalt road by means of a skid tester made by Stanley Works and represented as an index on the basis that Comparative Example 3 is 100. The larger the index value, the better the property.

The mill processability of the rubber composition was evaluated by observing a roll-retention state on a roll of 6 inch diameter at 60° C. The extrusion processability of the rubber composition was measured according to ASTM D2230-77 (A-method).

The molecular weight distribution of the polymer according to the invention was measured by means of a GPC, Model-244 made by Waters Co., Ltd. using a differential refractometer as a detector under the following conditions.
Column: Column GMH-3, GMH-6 or G6000H-6 made by Toyo Soda Co., Ltd.
Mobil phase: tetrahydrofuran The molecular weight as polystyrene in the polymer according to the invention was measured by using a monodisperse styrene polymer made by Waters Co., Ltd. and using the predetermined calibration curve for a relationship between the molecular weight in the peak of the monodisperse styrene polymer measured by GPC and the count of GPC.

EXAMPLE 1

Into a polymerization reactor of 10 l capacity with a stirrer were charged 1,000 g of cyclohexane, 144 g of 1,3-butadiene, 56 g of styrene and 4 g of tetrahydrofuran, and further 0.32 g of n-butyllithium was added to start isothermal polymerization at 60° C. Seven minutes later, when the conversion rate reached 20%, a mixture consisting of 4 g of tetrahydrofuran, 236 g of 1,3-butadiene, 44 g of styrene and 1,000 g of cyclohexane containing 5 ppm of water was continuously added at a rate of 31.1 g/min for 40 minutes.

Further, 20 g of 1,3-butadiene was continuously added at a rate of 2 g/min for 10 minutes. Thereafter, 0.175 g of tin tetrachloride was added to conduct the coupling reaction at 60° C. for 30 minutes.

The resulting polymer solution was added with 100 cc of cyclohexane containing 3.5 g of 2,6-di-tert-butyl-p-cresol as an antioxidant, subjected to a steam stripping to remove the solvent and dried on a roll heated at 110° C. to obtain a branched styrene-butadiene copolymer.

The properties of the resulting polymer are shown in the following Table 1. This polymer was kneaded with other ingredients according to a compounding recipe as shown in the following Table 2 by means of a 250 cc brabender and a 6 inch roll and then vulcanized at 160° C. for 12 minutes. The properties of the resulting vulcanizate are shown in the following Table 3.

EXAMPLE 2

Into a polymerization reactor of 10 l capacity with a stirrer were charged 1,000 g of cyclohexane, 170 g of 1,3-butadiene, 30 g of styrene and 8 g of tetrahydrofuran, and further 0.32 g of n-butyllithium was added to conduct isothermal polymerization at 60° C. Fifteen minutes later, when the conversion rate reached 35%, a mixture consisting of 8 g of tetrahydrofuran, 260 g of 1,3-butadiene, 20 g of styrene and 1,000 g of n-hexane containing 5 ppm of water was continuously added at a rate of 42.8 g/min for 30 minutes. Then, 20 g of 1,3-butadiene was continuously added at a ratio of 2 g/min for 10 minutes and thereafter 0.175 g of tin tetrachloride was added to conduct the coupling reaction at 60° C. for 30 minutes. Further, the same procedure as described in Example 1 was repeated to obtain polymer and vulcanizate each having properties as shown in Tables 1 and 3.

EXAMPLE 3

Into a polymerization reactor of 10 l capacity with a stirrer were charged 1,000 g of cyclohexane, 130 g of 1,3-butadiene, 70 g of styrene and 4 g of tetrahydrofuran, and further 0.34 g of n-butyllithium was added to conduct isothermal polymerization at 60° C. Ten minutes later, when the conversion rate reached 30%, a mixture consisting of 4 g of tetrahydrofuran, 200 g of 1,3-butadiene, 80 g of styrene and 1,000 g of n-hexane containing 5 ppm of water was continuously added at a rate of 42.8 g/min for 30 minutes, and then 20 g of 1,3-butadiene was continuously added at a rate of 2 g/min for 10 minutes. Thereafter, 0.150 g of tin tetrachloride was added to conduct the coupling reaction at 60° C. for 30 minutes. Further, the same procedure as described in Example 1 was repeated to obtain polymer and vulcanizate each having properties as shown in Tables 1 and 3.

COMPARATIVE EXAMPLE 1

Continuous polymerization was performed by using two reactors of 40 l capacity each equipped with a stirrer (l/d=2 in which l is a height, and d is a diameter) at 70° C.

To the first reactor were continuously supplied 3.17 kg/hr of 1,3-butadiene, 0.8 kg/hr of styrene, 16 kg/hr of cyclohexane, 96 g/hr of tetrahydrofuran and 2.56 g/hr of n-butyllithium. At the outlet of the first reactor, 30 g/hr of 1,3-butadiene and 1.2 g/hr of tin tetrachloride were supplied to the reaction product, which was transferred into the second reactor to conduct the coupling reaction. After 2,6-di-tert-butyl-p-cresol was added in an amount of 7 g per 1 kg of the polymer at the outlet of the second reactor, the desolvation and drying were carried out to obtain a branched styrene-butadiene copolymer having the properties as shown in Table 1. Further, the same procedure as described in Example 1 was repeated to obtain a vulcanizate having the properties as shown in Table 3.

COMPARATIVE EXAMPLE 2

The same procedure as described in Example 3 was repeated except that the monomer was continuously added from a time when the conversion rate reached 5% in 2 minutes after the beginning of the polymerization. The results are shown in Tables 1 and 3.

COMPARATIVE EXAMPLE 3

Into a polymerization reactor of 10 l capacity with a stirrer were charged 2,000 g of cyclohexane, 395 g of 1,3-butadiene, 100 g of styrene, 8 g of tetrahydrofuran and 0.31 g of n-butyllithium to perform polymerization at 60° C. for 45 minutes. Then, 5 g of 1,3-butadiene was added and five minutes thereafter, 0.15 g of tin tetrachloride was added to conduct the coupling reaction at 60° C. for 30 minutes. Further, the same procedure as described in Example 1 was repeated to obtain polymer and vulcanizate each having the properties as shown in Tables 1 and 3.

COMPARATIVE EXAMPLE 4

The same procedure as described in Example 1 was repeated except that 0.3 g of tetrahydrofuran was used instead of 4 g thereof in Example 1.

COMPARATIVE EXAMPLE 5

Into a polymerization reactor of 10 l capacity with a stirrer were charged 1,000 g of cyclohexane, 100 g of 1,3-butadiene, 100 g of styrene and 8 g of tetrahydrofuran, and further 0.33 g of n-butyllithium was charged to conduct isothermal polymerization at 60° C. Ten minutes later, when the conversion rate reached 32%, a mixture consisting of 8 g of tetrahydrofuran, 155 g of 1,3-butadiene, 125 g of styrene and 1,000 g of hexane containing 5 ppm of water was continuously added at a rate of 42.9 g/min for 30 minutes. Thereafter, 20 g of 1,3-butadiene was continuously added at a rate of 2 g/min for 10 minutes and further 0.175 g of tin tetrachloride was added to conduct the coupling reaction at 60° C. for 30 minutes. Further, the same procedure as described in Example 1 was repeated to obtain polymer and vulcanizate each having the properties as shown in Tables 1 and 3.

COMPARATIVE EXAMPLE 6

Into a polymerization reactor of 10 l capacity with a stirrer were charged 1,000 g of cyclohexane, 170 g of 1,3-butadiene, 30 g of styrene and 40 g of tetrahydrofuran, and further 0.37 g of n-butyllithium was added to conduct isothermal polymerization at 5° C. Fifteen minutes later, when the conversion rate reached 25%, a mixture consisting of 40 g of tetrahydrofuran, 270 g of 1,3-butadiene, 20 g of styrene and b 1,000 g of cyclohexane containing 5 ppm of water was continuously added at a rate of 33.2 g/min for 40 minutes. Then, 10 g of 1,3-butadiene was continuously added at a rate of 2 g/min for 5 minutes and further 0.175 g of tin tetrachloride was added to perform the coupling reaction at 30° C. for 60 minutes. Further, the same procedure as described in Example 1 was repeated to obtain polymer and vulcanizate each having the properties as shown in Tables 1 and 3.

COMPARATIVE EXAMPLE 7

The same procedure as described in Example 1 was repeated except that 0.35 g of n-butyllithium was employed instead of 0.32 g thereof and 0.015 g of tin tetrachloride was employed instead of 0.175 g thereof.

COMPARATIVE EXAMPLE 8

The same procedure as described in Example 1 was repeated except that 0.110 g of silicon tetrachloride was used instead of 0.175 g of tin tetrachloride.

EXAMPLE 4

The same procedure as described in Example 1 was repeated except that a mixture consisting of 4 g of tetrahydrofuran, 236 g of 1,3-butadiene, 44 g of styrene, 0.061 g of 2,6-di-tert-butyl-p-cresol and 1,000 g of cyclohexane was employed instead of the mixture consisting of 4 g of tetrahydrofuran, 236 g of 1,3-butadiene, 44 g of styrene and 1,000 g of cyclohexane containing 5 ppm of water.

EXAMPLE 5

Into a polymerization reactor of 10 l capacity with a stirrer were charged 2,000 g of cyclohexane, 144 g of 1,3-butadiene, 56 g of styrene and 4 g of tetrahydrofuran, and further 0.32 g of n-butyllithium was charged to conduct isothermal polymerization at 60° C. Seven minutes later, when the conversion rate reached 20%, a mixture consisting of 4 g of tetrahydrofuran, 236 g of 1,3-butadiene containing 450 ppm of methylallene and 44 g of styrene was continuously added at a rate of 7.1 g/min for 40 minutes. Then, 20 g of 1,3-butadiene was continuously added at a rate of 2 g/min for 10 minutes and thereafter 0.175 g of tin tetrachloride was added to conduct the coupling reaction at 60° C. for 30 minutes. Further, the same procedure as described in Example 1 was repeated to obtain polymer and vulcanizate each having the properties as shown in Tables 1 and 3.

As apparent from Tables 1 and 3, the polymers in the above Examples are excellent in the processability, and the vulcanizates produced therefrom are excellent in the tensile strength and rebound resilience at 50° C.

TABLE 1(a)

| Polymer | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|
| Mooney viscosity (ML$_{1+4}$ 100° C.) | 52 | 55 | 47 | 50 | 50 | 49 | 45 | 52 | 53 | 50 | 45 | 30 | 50 |
| Content of bound styrene (wt %) | 20 | 10 | 30 | 20 | 20 | 20 | 30 | 20 | 20 | 45 | 10 | 20 | 20 |
| Ratio of block polystyrene in bound styrene (wt %) | 0 | 0 | 1.0 | 0 | 0 | 0 | 0 | 1.0 | 3.0 | 3.0 | 0 | 0 | 0 |
| Microstructure of butadiene unit (%) | | | | | | | | | | | | | |
| cis | 18 | 11 | 19 | 18 | 18 | 18 | 19 | 18 | 31 | 19 | 2 | 18 | 18 |
| trans | 32 | 19 | 36 | 32 | 32 | 32 | 36 | 32 | 49 | 36 | 7 | 32 | 32 |
| vinyl | 50 | 70 | 45 | 50 | 50 | 50 | 45 | 50 | 20 | 45 | 91 | 50 | 50 |
| Ratio of branched polymer in the polymer (%) | 49 | 50 | 42 | 50 | 51 | 51 | 42 | 50 | 49 | 51 | 50 | 10 | 50*[2] |
| Mw/Mn*[1] | 2.2 | 2.1 | 2.2 | 2.2 | 2.2 | 3.0 | 2.9 | 1.8 | 2.1 | 2.1 | 2.1 | 2.2 | 2.2 |
| Ratio of component having a molecular weight of less than | 15 | 15 | 16 | 16 | 16 | 22 | 22 | 5 | 14 | 15 | 15 | 15 | 15 |

TABLE 1(a)-continued

| Polymer | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|
| $10^5$ as measured by GPC (%) Ratio of component having a molecular weight of less than $5 \times 10^4$ as measured by GPC (%) | 6 | 6 | 5 | 5 | 6 | 8 | 11 | 2 | 7 | 6 | 6 | 5 | 6 |

*[1] $\overline{Mw}$: weight-average molecular weight  $\overline{Mn}$: number-average molecular weight
*[2] branched structure through Si—C bond

TABLE 2

| | Parts by weight |
|---|---|
| Rubber | 100 |
| Carbon black HAF | 50 |
| High aromatic oil | 10 |
| Zinc white | 3 |
| Stearic acid | 2 |
| Antioxidant 810NA[1] | 1 |
| Vulcanization accelerator CZ[2] | 1 |
| Sulfur | 1.7 |

[1] N—phenyl-N'—isopropyl-p-phenylenediamine
[2] N—cyclohexyl-2-benzothiazolsulfeneamide

TABLE 3

| | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|
| <Processabilities> | | | | | | | | | | | | | |
| Mill processability | good | good | good | good | good | good | good | bad | good | good | good | good | good |
| Extrusion speed (cc/min) | 252 | 250 | 260 | 245 | 248 | 250 | 250 | 115 | 136 | 250 | 230 | 260 | 245 |
| Index by Garvey die extrusion test | 15 | 15 | 16 | 15 | 15 | 15 | 15 | 7 | 8 | 15 | 14 | 16 | 14 |
| Properties of vulcanizate | | | | | | | | | | | | | |
| 300% modulus (kg·f/cm$^2$) | 141 | 142 | 146 | 145 | 140 | 130 | 135 | 157 | 135 | 150 | 145 | 140 | 144 |
| Tensile strength (kg·f/cm$^2$) | 214 | 210 | 230 | 213 | 215 | 210 | 210 | 215 | 210 | 200 | 185 | 195 | 205 |
| Elongation (%) | 420 | 430 | 430 | 420 | 410 | 430 | 420 | 400 | 410 | 400 | 390 | 400 | 425 |
| Hardness (JIS-A) | 65 | 65 | 65 | 65 | 65 | 65 | 65 | 65 | 65 | 66 | 66 | 65 | 65 |
| Rebound resilience at 50° C. (%) | 64 | 64 | 64 | 64 | 65 | 61 | 62 | 64 | 61 | 61 | 62 | 60 | 61 |
| Wet skid resistance (index) | 105 | 100 | 110 | 105 | 105 | 105 | 110 | 100 | 90 | 115 | 115 | 95 | 105 |

What is claimed is:

1. A vulcanized rubber composition comprising a butadiene-base polymer containing a branched polymer through a tin-carbon bond at a branching point, which is produced by polymerizing 1,3-butadiene alone or 1,3-butadiene and an aromatic vinyl compound in a hydrocarbon solvent in the presence of a Lewis base using an organolithium compound as an initiator and satisfies the following requirements:
   (1) the content of said aromatic vinyl compound in the butadiene-base polymer is 0–40% by weight;
   (2) the content of a vinyl bond-containing butadiene unit in the total butadiene unit of the butadiene-base polymer is 30–90%;
   (3) the content of the branched polymer in the butadiene-base polymer is at least 30% by weight; and
   (4) the content of a component having a molecular weight of less than 100,000 as polystyrene in the molecular weight distribution as measured by gel permeation chromatography is 10–20% by weight.

2. The vulcanized rubber composition comprising a butadiene-base polymer as claimed in claim 1, wherein said tin-carbon bond is a tin-butadienyl bond.

3. The vulcanized rubber composition comprising a butadiene-base polymer as claimed in claim 1, wherein said content of the bound aromatic vinyl compound is 10–30% by weight.

4. The vulcanized rubber composition comprising a butadiene-base polymer as claimed in claim 1, wherein said bound aromatic vinyl compound contains not more than 10% of a block polyaromatic vinyl compound.

5. The vulcanized rubber composition comprising a butadiene-base polymer as claimed in claim 1, wherein said content of a vinyl bond-containing butadiene unit is 35–75%.

6. The vulcanized rubber composition comprising a butadiene-base polymer as claimed in claim 1, wherein said content of the branched polymer is not less than 40% by weight.

7. The vulcanized rubber composition comprising a butadiene-base polymer as claimed in claim 1, wherein said polymer has a Mooney viscosity (ML$_{1+4}$ 100° C.) of 30–100.

8. A process for the production of a vulcanized rubber composition comprising a butadiene-base polymer containing a branched polymer and satisfying the following requirements:
   (1) a content of a bound aromatic vinyl compound in the butadiene-base polymer is 0–40% by weight;
   (2) a content of a vinyl bond-containing butadiene unit in the total butadiene unit of the butadiene-base polymer is 30–90%;
   (3) a content of the branched polymer in the butadiene polymer is at least 30% by weight; and
   (4) a content of a component having a molecular weight of less than 100,000 as polystyrene in the molecular weight distribution as measured by gel permeation chromatography is 10–20% by weight,
   which process comprises the steps of:
   (A) polymerizing 1,3-butadiene alone or 1,3-butadiene and an aromatic vinyl compound in a hydrocarbon solvent in the presence of Lewis base using an organolithium compound as an initiator, while continuously or intermittently adding a hydrocarbon solvent containing an active hydrogen-containing compound selected from the group consisting of water, alcohols and phenols in an amount of 0.01–0.20 mol per one atomic equivalent of lithium atom in the organolithium initiator at such a stage that the conversion rate reaches 10–90%;
- (B) coupling the resulting butadiene-base polymer with a lithium atom at the terminal thereof with a tin halide; and
- (C) vulcanizing said polymer.

9. A process for the production of a vulcanized rubber composition comprising a butadiene-base polymer containing a branched polymer and satisfying the following requirements:
- (1) a content of a bound aromatic vinyl compound in the butadiene-base polymer is 0–40% by weight;
- (2) a content of a vinyl bond-containing butadiene unit in the total butadiene unit of the butadiene-base polymer is 30–90%;
- (3) a content of the branched polymer in the butadiene-base polymer is at least 30% by weight; and
- (4) a content of a component havin a molecular weight of less than 100,000 as polystyrene in the molecular weight distribution as measured by gel permeation chromatography is 10–20% by weight, which process comprises the steps of:
  - (A) polymerizing 1,3-butadiene alone or 1,3-butadiene and an aromatic vinyl compound in a hydrocarbon solvent in the presence of a Lewis base using as organolithium compound as an initiator, while continuously or intermittently adding a compound selected from the group consisting of α-acetylenes, allenes, active hydrogen-containing compounds and halogen compounds in an amount of 0.1–2.0 mol per one atomic equivalent of lithium atom in the organolithium initiator at such a stage that the conversion rate reaches 10–90%;
  - (B) coupling the resulting butadiene-base polymer with a lithium atom at the terminal thereof with a tin halide; and
  - (C) vulcanizing said polymer.

10. The process as claimed in claim 8 or 9, further comprising adding 1,3-butadiene in an amount of 0.5 to 100 mol per one atomic equivalent of the lithium atom in the organolithium compound immediately before the coupling.

11. The process as claimed in claim 8 or 9, wherein said organolithium compound is selected from the group consisting of ethyllithium, propyllithium, butyllithium, pentyllithium, 1,4-dilithiobutane and 1,5-dilithiopentane, and is used in an amount of 0.2–20 mmol per 100 per g of the monomer.

12. The process as claimed in claim 8 or 9, wherein the polymerization is carried out at a temperature of −20° C. to 150° C.

13. The process as claimed in claim 8 or 9, wherein said hydrocarbon solvent is at least one hydrocarbon selected from the group consisting of pentane, hexane, heptane, cyclohexane, methylcyclopentane, benzene, toluene and xylene, and is used in an amount of 0.5–20 parts by weight per one part by weight of the monomer.

14. The process as claimed in claim 8, wherein said active hydrogen-containing compound is selected from the group consisting of water, methanol, ethanol, propanol, butanol, 2-ethylhexanol, decanol, phenol, cresol, nonyl phenol, xylenol, 2,6-di-tert-butyl-p-cresol and 2(3)-butyl-4-hydroxyanisole.

15. The process as claimed in claim 9, wherein said α-acetylene is selected from the group consisting of acetylene, propyne, 1-butyne, isopropenyl acetylene and vinylacetylene, and said allene is selected from the group consisting of allene, methylallene and ethylallene, and said active hydrogen-containing compound is selected from the group consisting of cyclopentadiene, indene, 9-phenylfluorene, 1,4-dihydrobenzene and dihydronaphthalene, and said halogen compound is selected from the group consistng of benzyl chloride, allyl chloride, crotyl chloride and t-butyl chloride.

16. The process as claimed in claim 8 or 9, wherein said coupling is carried out at a temperature of 0°–150° C. for 1 minute to 20 hours.

17. The process as claimed in claim 8 or 9, wherein said tin halide is selected from the group consisting of tin methyl trichloride, tin tetrachloride, tin butyl trichloride, tin octyl trichloride, tin methyl tribromide, tin octyl tribromide, tin tetrabromide, tin tetraiodide, tin cyclohexyl trichloride, tin phenyl trichloride, 1,2-bis(-trichlorostannyl)ethane, 1,2-bis(methyldichlorostannyl)ethane, 1,4-bis(trichlorostannyl)butane and 1,4-bis(-methyldichlorostannyl)butane, and is used in an amount of 0.1–3.0 equivalent of halogen atom per one atomic equivalent of lithium atom in the organolithium compound.

* * * * *